United States Patent
Bae et al.

(10) Patent No.: US 11,792,408 B2
(45) Date of Patent: Oct. 17, 2023

(54) TRANSCODER TARGET BITRATE PREDICTION TECHNIQUES

(71) Applicant: Alibaba Group Holding Limited, Georgetown (KY)

(72) Inventors: Tae Meon Bae, Hangzhou (CN); Minghai Qin, Hangzhou (CN); Yen-kuang Chen, Hangzhou (CN); Guanlin Wu, Hangzhou (CN); Sicheng Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/834,196

(22) Filed: Mar. 30, 2020

(65) Prior Publication Data

US 2021/0306641 A1   Sep. 30, 2021

(51) Int. Cl.
*H04N 19/147* (2014.01)
*H04N 19/184* (2014.01)
*H04N 19/61* (2014.01)

(52) U.S. Cl.
CPC ......... *H04N 19/147* (2014.11); *H04N 19/184* (2014.11); *H04N 19/61* (2014.11)

(58) Field of Classification Search
CPC ..... H04N 19/147; H04N 19/184; H04N 19/61
USPC .................................................... 375/240.16
See application file for complete search history.

(56) References Cited

U.S. PATENT DOCUMENTS

| | | |
|---|---|---|
| 5,392,072 A | 2/1995 | Rodriguez et al. |
| 6,675,387 B1 | 1/2004 | Boucher et al. |
| 6,911,987 B1 | 6/2005 | Mairs et al. |
| 7,072,512 B2 | 7/2006 | Mehrotra |
| 7,702,171 B2 | 4/2010 | Murai et al. |
| 8,549,574 B2 | 10/2013 | Perlman et al. |
| 8,782,713 B2 | 7/2014 | Kalva et al. |
| 8,881,215 B2 | 11/2014 | Perlman et al. |
| 10,291,827 B2 | 5/2019 | Ma et al. |
| 10,432,944 B2 | 10/2019 | Hamilton et al. |
| 2004/0001634 A1 | 1/2004 | Mehrotra |
| 2004/0223650 A1* | 11/2004 | Guillou ............... H04N 19/147 382/232 |
| 2008/0201751 A1 | 8/2008 | Ahmed et al. |
| 2013/0027568 A1* | 1/2013 | Zou ........................ H04N 19/61 348/192 |
| 2013/0050254 A1 | 2/2013 | Tran et al. |
| 2015/0350726 A1* | 12/2015 | Tan ........................ H04N 19/40 348/445 |
| 2018/0316942 A1 | 11/2018 | Todd |
| 2018/0316948 A1 | 11/2018 | Todd |
| 2020/0195934 A1* | 6/2020 | Xing .................... H04N 19/154 |

FOREIGN PATENT DOCUMENTS

| | | |
|---|---|---|
| CN | 101420614 A | 4/2009 |
| CN | 101888884 A | 11/2010 |
| CN | 102428483 A | 4/2012 |

(Continued)

*Primary Examiner* — Ayman A Abaza (57) ABSTRACT

Transcoding bitrate prediction techniques can include receiving a first encoded content. A transcoder bitrate can be estimated based on regression over a video quality estimator of the first encoded content and a second encoded content. The estimated transcoder bitrate can be utilized to transcoding the first encoded content into the second encoded.

15 Claims, 5 Drawing Sheets

(56) References Cited

FOREIGN PATENT DOCUMENTS

| | | | |
|---|---|---|---|
| CN | 102428484 | A | 4/2012 |
| CN | 105900432 | A | 8/2016 |
| EP | 2044543 | A2 | 4/2009 |
| KR | 20060027795 | A | 3/2006 |
| KR | 100656645 | B1 | 12/2006 |
| WO | 2007119236 | A2 | 10/2007 |

* cited by examiner

TRANSCODER TARGET BITRATE PREDICTION TECHNIQUES

BACKGROUND OF THE INVENTION

Figure 1:
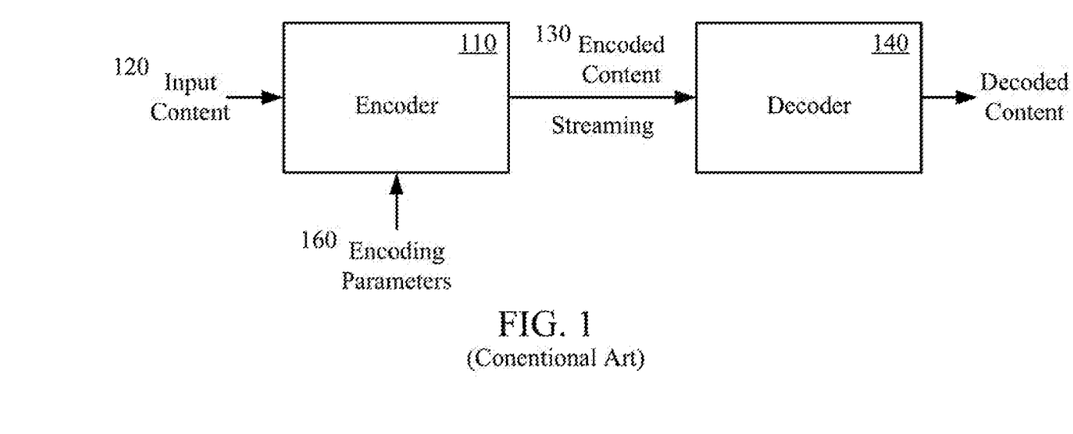
FIG. 1 shows a data compression system according to the conventional art.

Data compression is utilized to reduce the number of bits used to transmit and or store video content and the like. Referring to FIG. 1, a data compression system according to the conventional art is shown. The data compression system can include an encoder 110 to compress input video content 120 into encoded data 130 for streaming to one or more users. The encoded content 130 advantageously reduces the bandwidth utilization for streaming the encoded content. The encoded content 130 received by a user device can then be decoded 140 to generate decoded content 150. Encoding above a factor of ten is typically lossy, wherein the visual quality of the content is impacted. Encoding parameters 160 can be used to adjust the data compression by the encoder 120 to achieve a given bitrate, visual quality, encoding latency and or the like. Commonly, the encoding parameter values that provide a given bitrate, visual quality, encoding latency and or the like are determined by a brute force search. In a brute force search, input content is encoded with a given set of encoding parameter values, then decoded, and the decoded content is compared to the original input content for an objective quality determination.

Figure 2:
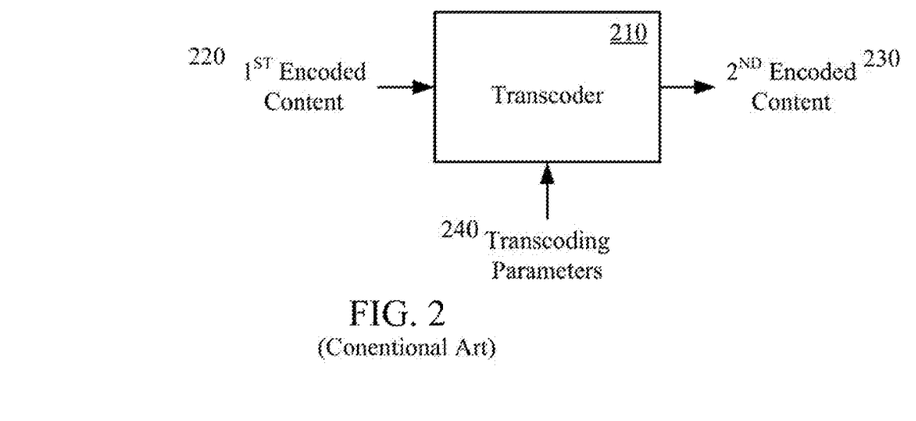
FIG. 2 shows a transcoding system according to the conventional art.

In some cases, encoded data in a first format can be converted into a second encoded format. Referring now to FIG. 2, a transcoder according to the conventional art is shown. The transcoder 210 is utilized to convert from a first encoded content 220 to a second encoded content 230. Transcoding can also be a lossy processing and cumulative with the encoding losses. Transcoding parameters 240 can be used to adjust the transcoding process to achieve a given bitrate, visual quality, transcoding latency and or the like. Typically, the original input content is not available for a brute or search of the transcoding parameters. A brute force determination of an optimal target bitrate for the transcoder typically includes multiple encoding and objective quality measurements by a prediction model, which is computationally complex. Alternatively, a higher than needed default bitrate can be utilized, which reduces the compression efficiency of the transcoder. Accordingly, there is a continuing need for improved target bitrate determination techniques for transcoding.

SUMMARY OF THE INVENTION

The present technology may best be understood by referring to the following description and accompanying drawings that are used to illustrate embodiments of the present technology directed toward transcoder bitrate prediction.

In one embodiment, a computing system can include one or more processors, memory and one or more transcoders. Instructions stored in the memory can cause the processor to perform a video encoding method including receiving a first encoded content, and estimating a transcoder bitrate based on regression of a video quality estimator over the first encoded content and the second encoded content. The video encoder can be configured to convert the first encoded content to the second encoded content based on one or more transcoding parameter values including the estimated transcoder bitrate, In another embodiment, a transcoder method can include receiving a first encoder content and a set of encoder information of the first encoded content, h can be determined if the received set of encoder information matches one of a plurality of existing sets of encoder information. When the received encoder information does not match one of the plurality of existing sets of encoder information, a predetermined target bitrate can be selected as a transcoder bitrate. When the received encoder information matches one of the plurality of existing sets of encoder information, a visual quality estimator of the corresponding one of the plurality of existing sots of encoder information matching the received set of encoder information can be chosen. The transcoder bitrate can be estimated based on regression of the matched video quality estimator over the first encoded content and a second encoded content, when the received encoder information matches one of the plurality of existing sets of encoder information. The first encoded content can be transcoded into the second encoded content based on one or more transcoding parameter values including the transcoder bitrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 3:
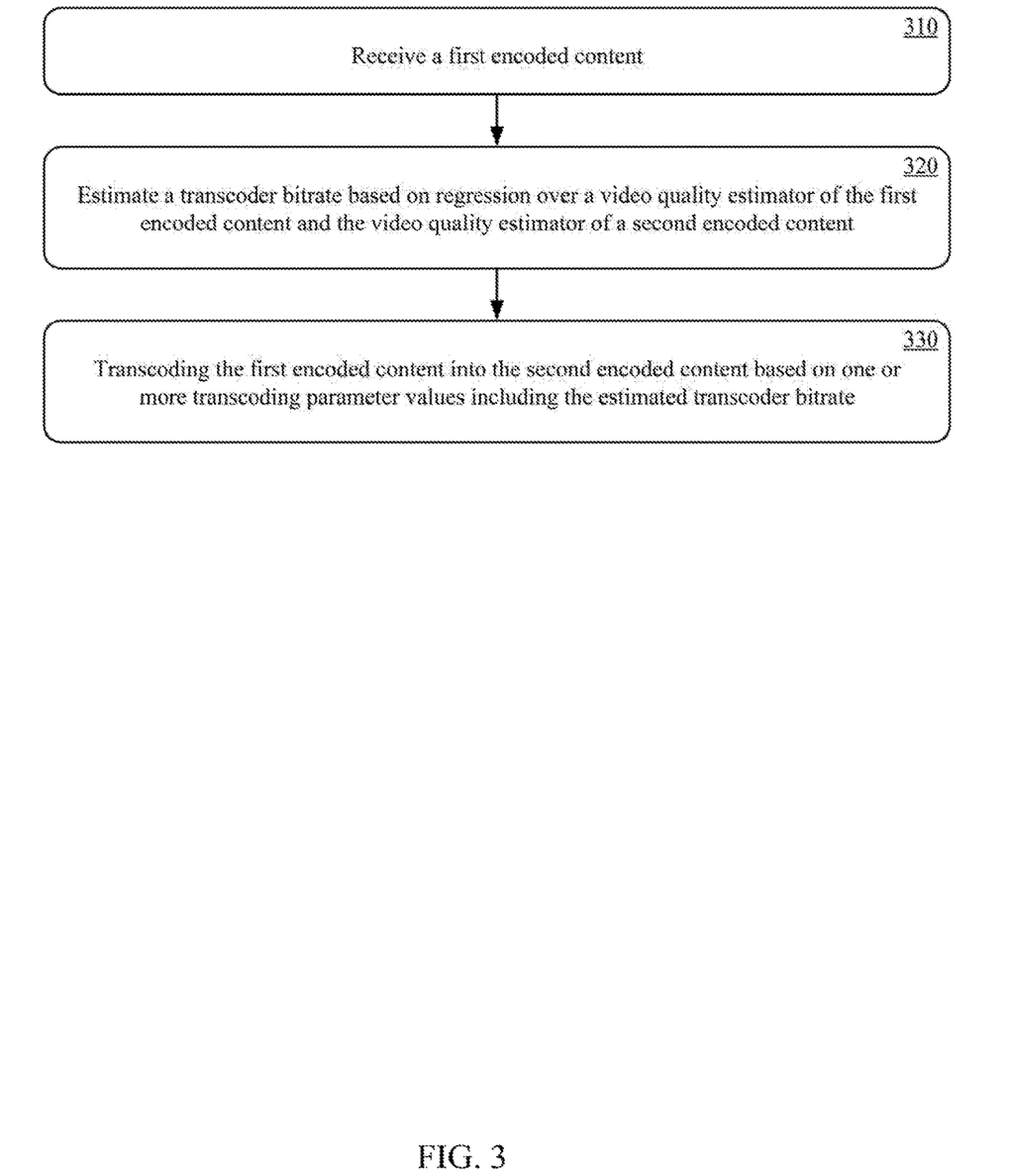
FIG. 3 shows a transcoder method, in accordance with aspects of the present technology.

Referring now to FIG. 3, a transcoder method, in accordance with aspects of the present technology, is shown. The method can include receiving a first encoded content, at 310. In one implementation, the first encoded content can be video content encoded in a first encoder format.

At 320, a transcoder bitrate can be estimated based on regression over a video quality estimator of the first encoded content and a second encoded content. The second encoded content can be a transcoding of the first video content. The regression can be a linear or polynomial regression over the video quality estimator of the first encoded content and the second encoded content. In one implementation, the transcoded bitrate can be estimated based on a linear regression over a video multimethod assessment fusion (VMAF) estimator. For example, a predetermined VMAF (PredVMAF) can be a function of a bitrate of an input encoded content (e.g., first encoded content) and a bitrate of an output encoded content (e.g., second encoded content) for the transcoder as expressed by Equation 1:

$$Pred\_VMAF = f(bitrate\_in\_video, bitrate\_out\_video) \quad (1)$$
$$= a*\ln(bitrate\_in\_video) + b*\ln(bitrate\_out\_video)$$

wherein bitrate_invideo is the bitrate of the input encoded content and bitrate_out_video is the bitrate of the output encoded content. The target VMAF (Target_VMAF) can be a function of a bitrate of an input encoded content (e.g., first encoded content) and a bitrate of an output encoded content (e.g., second encoded content) for the transcoder as expressed by Equation 2:

$$Target\_VMAF = f(bitrate\_in\_video, bitrate\_out\_video) \quad (2)$$
$$= a*\ln(bitrate\_in\_video) + b*\ln(bitrate\_out\_video) + c$$

The target bitrate (Bitrate_out_video) can be expressed in accordance with Equation 3:

$$Bitrate\_out\_video = e^{(TargetVMAP-(a+\ln(bitrate\_in\_video)+c)/a} \quad (3)$$

In another example, the transcoded bitrate can be estimated based on a polynomial regression over the VMAF estimator. For example, a predetermined VMAF (Pred_VMAF) can be a function of a bitrate of an input encoded content (e.g., first encoded content) and a bitrate of an output encoded content (e.g., second encoded content) for the transcoder as expressed by Equation 4:

$$Pred\_VMAF = f(bitrate\_in\_video, bitrate\_out\_video) \quad (4)$$
$$= a*x + b*x^2 + c*y + d*y^2 + f$$

wherein bitrate_in_video is the bitrate of the input encoded content, bitrate_out_video is the bitrate of the output encoded content, x=ln(bitrate_invideo), and y=ln(bitrate_out_video). The target VMAF (Target_VMAF) can be a function of a bitrate of an input encoded content (e.g., first encoded content) and a bitrate of an output encoded content (e.g., second encoded content) for the transcoder as expressed by Equation 5:

$$Target\_VMAF = f(bitrate\_in\_video, bitrate\_out\_video) \quad (5)$$
$$= a*x + b*x^2 + c*y + d*y^2 + e$$

The target bitrate (Bitrate_out_video) can be expressed in accordance with Equation 6:

$$Bitrate\_out\_video = e^{(\sqrt{d^2-4f*c}-d)/2c} \text{ where} \quad (6)$$
$$f = e + a*x^2 + b*x - Target\_VMAF$$

At 330, the first encoded content can be transcoded into the second encoded content based on one or more transcoding parameter values including the estimated transcoder bitrate.

Figure 4:
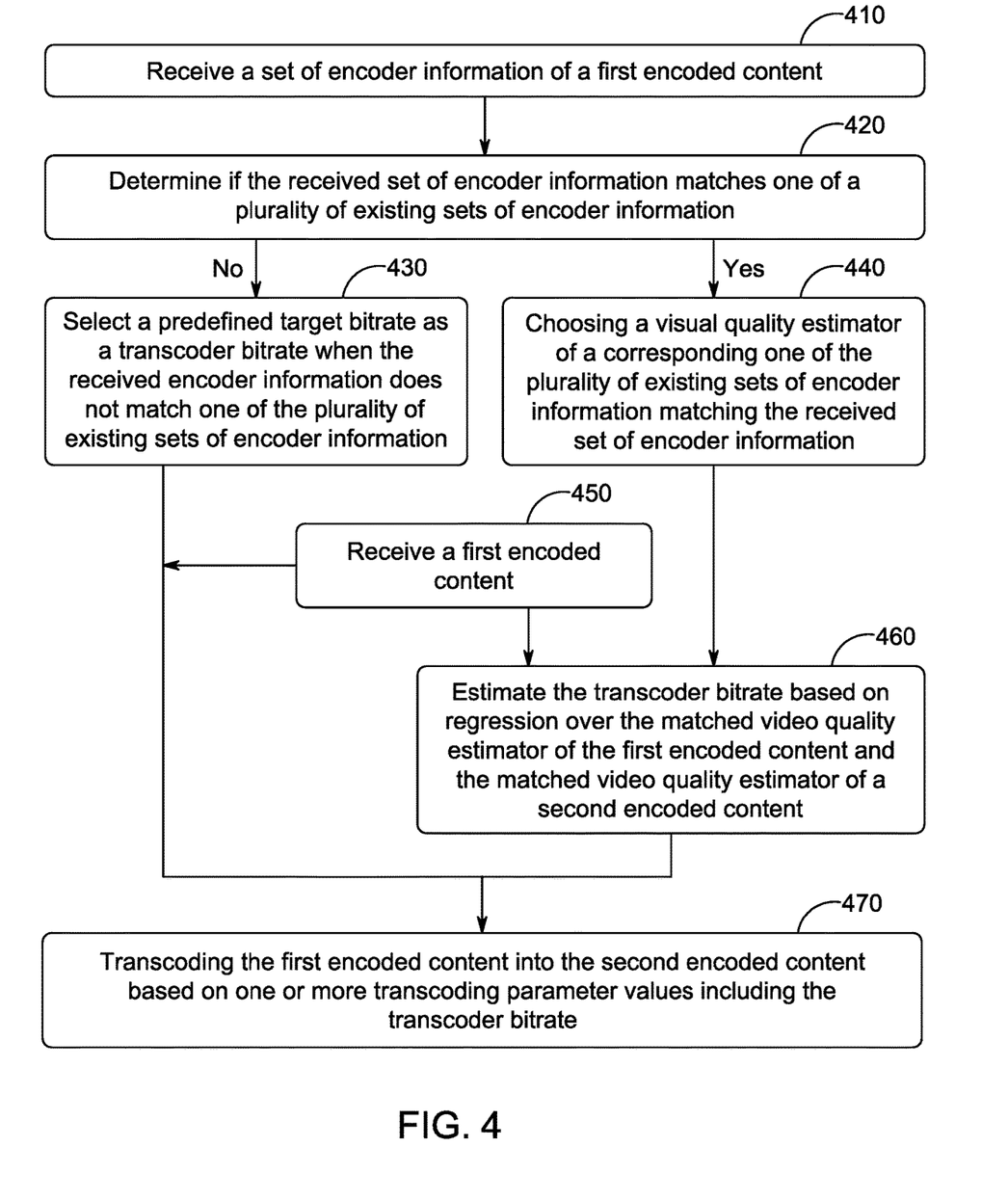
FIG. 4 shows a transcoder method, in accordance with aspects of the present technology.

Referring now to FIG. 4, another transcoder method, in accordance with aspects of the present technology, is shown. The method can include receiving a set of encoder information of a first encoded content, at 410. In one implementation, the encoder information can include the encoder type, encoding parameters and the like of an encoder.

At 420, it can be determined if the received set of encoder information matches one of a plurality of existing sets of encoder information. In one implementation, the plurality of existing sets of encoder information and corresponding visual quality estimator can be determined by training a plurality of different visual quality estimators on different sets of encoding information. For example, a plurality of VMAF estimators can be trained based on a plurality of different encoding information. At 430, a predefined target bitrate can be selected as a transcoder bitrate when the received encoder information does not match one of the plurality of existing sets of encoder information. In one implementation, the predefined target bitrate can be a redundant high default target bitrate.

At 440, a visual quality estimator of the corresponding one of the plurality of existing sets of encoder information can be selected when the received encoder information matches the corresponding one of the plurality of existing sets of encoder information. For example, the VMAF estimator of a corresponding one of the plurality of VMAF estimators that matches the encoding information of the encoder.

At 450, a first encoded content of an encoder for the received encoder information can be received. At 460, the transcoder bitrate can be estimated based on regression over the matched video quality estimator of the first encoded content and a second encoded content. The second encoded content can be a transcoding of the first video content. The regression can be a linear or polynomial regression over the video quality estimator of the first encoded content and the second encoded content. In one implementation, the transcoded bitrate can be estimated based on a linear regression over the VMAF estimator. For example, a predetermined VMAF (Pred_VMAF) can be a function of a bitrate of an input encoded content (e.g., first encoded content) and a bitrate of an output encoded content (e.g., second encoded content) for the transcoder as expressed by Equation 1:

$$\text{Pred\_VMAF} = f(\text{bitrate\_in\_video}, \text{bitrate\_out\_video}) \quad (1)$$
$$= a * \ln(\text{bitrate\_in\_video}) + b * \ln(\text{bitrate\_out\_video})$$

wherein bitrate_in_video is the bitrate of the input encoded content and bitrate_out_video is the bitrate of the output encoded content. The target VMAF (Target_VMAF) can be a function of a bitrate of an input encoded content (e.g., first encoded content) and a bitrate of an output encoded content (e.g., second encoded content) for the transcoder as expressed by Equation 2:

$$\text{Target\_VMAF} = f(\text{bitrate\_in\_video}, \text{bitrate\_out\_video}) \quad (2)$$
$$= a * \ln(\text{bitrate\_in\_video}) + b * \ln(\text{bitrate\_out\_video}) + c$$

The constants a, b and c can be obtained from the training of the plurality of different visual quality estimators on the different sets of encoding information. The target bitrate (Bitrate_out_video) can be expressed in accordance with Equation 3:

$$\text{Bitrate\_out\_video} = e^{(\text{TargetVMAF} - (a * \ln(\text{bitrate\_in\_video}) + c)/a)} \quad (3)$$

In another example, the transcoded bitrate can be estimated based on a polynomial regression over the VMAF estimator. For example, a predetermined VMAF (Pred_VMAF) can be a function of a bitrate of an input encoded content (e.g., first encoded content) and a bitrate of an output encoded content (e.g., second encoded content) for the transcoder as expressed by Equation 4:

$$\text{Pred\_VMAF} = f(\text{bitrate\_in\_video}, \text{bitrate\_out\_video}) \quad (4)$$
$$= a*x + b*x^2 + c*y + d*y^2 + f$$

wherein bitrate_in_video is the bitrate of the input encoded content, bitrate_out_video is the bitrate of the output encoded content, $x = \ln(\text{bitrate\_in\_video})$, and $y = \ln(\text{bitrate\_out\_video})$. The target VMAF (Target_YMAF) can be a function of a bitrate of an input encoded content (e.g., first encoded content) and a bitrate of an output encoded content (e.g., second encoded content) for the transcoder as expressed by Equation 5:

$$\text{Target\_VMAF} = f(\text{bitrate\_in\_video}, \text{bitrate\_out\_video}) \quad (5)$$
$$= a*x + b*x^2 + c*y + d*y^2 + e$$

The constants a, b, c, d and e can be obtained from the training of the plurality of different visual quality estimators on the different sets of encoding information. The target bitrate (Bitrate_out_video) can be expressed in accordance with Equation 6:

$$\text{Bitrate\_out\_video} = e^{(\sqrt{d^2 - 4f*c} - d)/2c} \text{ where} \quad (6)$$
$$f = e + a*x^2 + b*x - \text{Target\_VMAF}$$

At 470, the first encoded content can be transcoded into the second encoded content based on one or more transcoding parameter values including the transcoder bitrate. For example, when the received encoder information does not match one of the plurality of existing sets of encoder information, the first encoded content can be transcoded into the second encoded content at the predetermined bitrate. When the received encoder information matches a corresponding one of the plurality of existing sets of encoder information, the first encoded content can be transcoded into the second encoded content at the estimated transcoder bitrate based on regression over the matched video quality estimator of the first encoded content and the second encoded content.

Figure 5:
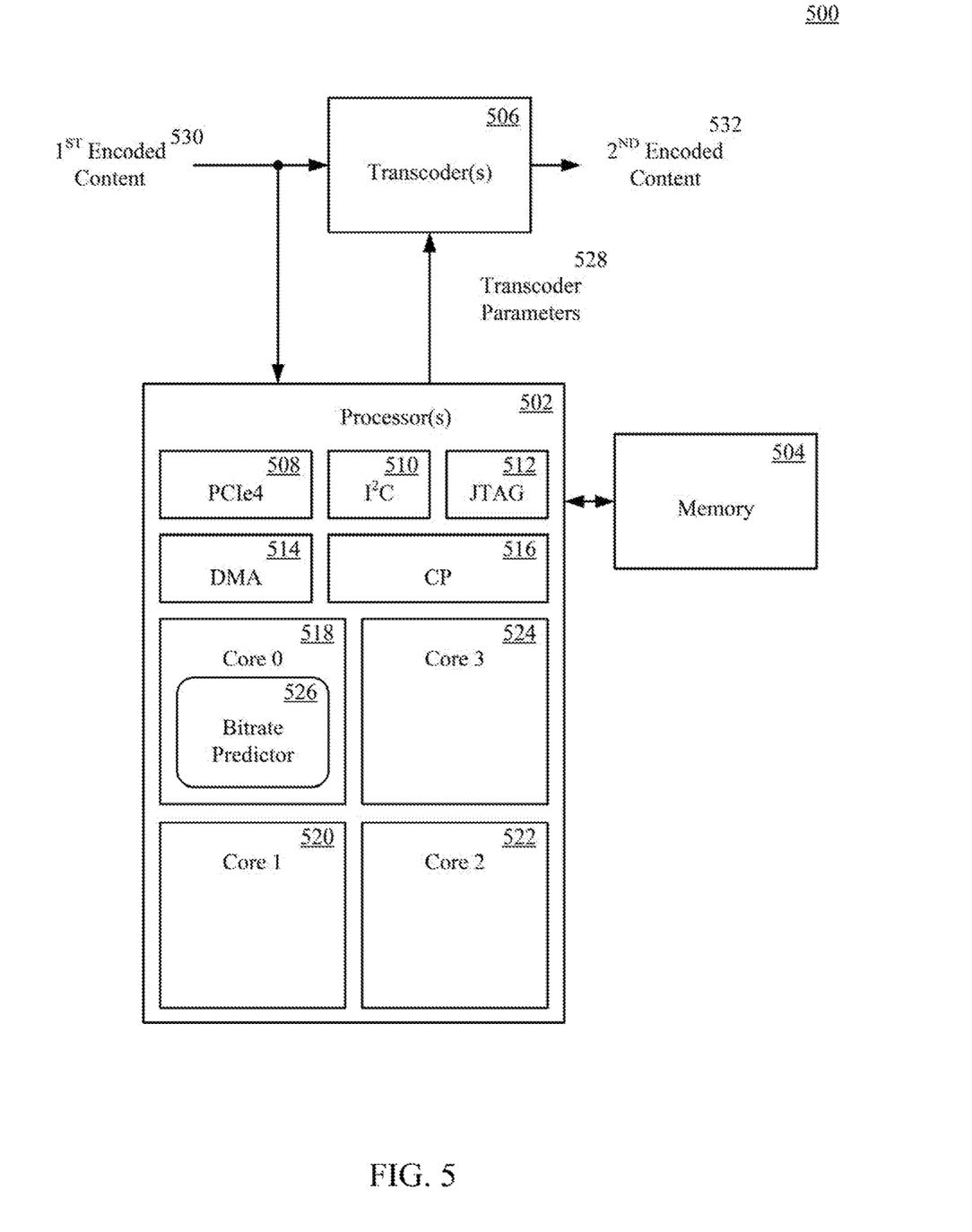
FIG. 5 shows a computing system for transcoding content, in accordance with aspects of the present technology.

Referring now to FIG. 5, a computing system for transcoding content, in accordance with aspects of the present technology, is shown. The computing system 500 can include one or more processors 502, memory 504 and one or more transcoders 506. The one or more transcoders 506 can be implemented in separate hardware, or in software executing on the one or more processes 502. In one implementation, the computing system 500 can be a server computer, a data center, a cloud computing system, a stream service system, an internet service provider system, a cellular service provider system, or the like.

The one or more processors 502 can be central processing units (CPU), graphics processing units (GPU), neural processing units (NPU), vector processors, memory processing units, or the like, or combinations thereof. In one implementation, a processor 502 can include one or more communication interfaces, such as peripheral component interface (PCIe4) 508 and inter-integrated circuit (I²C) interface 510, an on-chip circuit tester, such as a joint test action group (JTAG) engine 512, a direct memory access engine 514, a command processor (CP) 516, and one or more cores 518-524. The one or more cores 518-524 can be coupled in a direction ring bus configuration.

Figure 6:
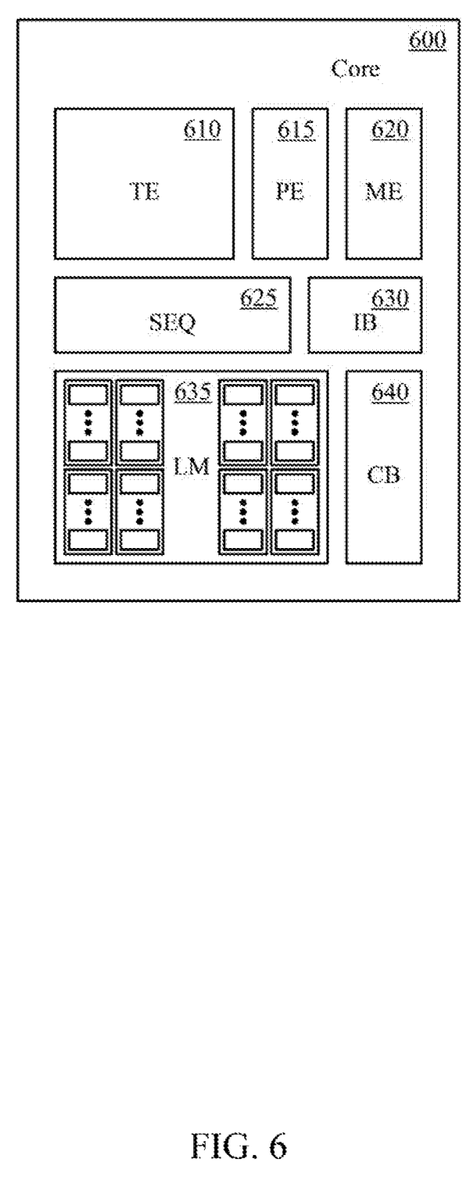
FIG. 6 shows an exemplary processing core, in accordance with aspects of the present technology.

Referring now to FIG. 6, an exemplary processing core, in accordance with aspects of the present technology, is shown. The processing core 600 can include a tensor engine (TE) 610, a pooling engine (PE) 615, a memory copy engine (ME) 620, a sequencer (SEQ) 625, an instructions buffer (IB) 630, a local memory (LM) 635, and a constant buffer (CB) 640. The local memory 635 can be pre-installed with model weights and can store in-use activations on-the-fly. The constant buffer 640 can store constant for batch normalization, quantization and the like. The tensor engine 610 can be utilized to accelerate fused convolution and or matrix multiplication. The pooling engine 615 can support pooling, interpolation, region-of-interest and the like operations. The memory copy engine 620 can be configured for inter- and or intra-core data copy, matrix transposition and the like. The tensor engine 610, pooling engine 615 and memory copy engine 620 can run in parallel. The sequencer 625 can orchestrate the operation of the tensor engine 610, the pooling engine 615, the memory copy engine 620, the local memory 635, and the constant buffer 640 according to instructions from the instruction buffer 630. The processing core 600 can provide video coding efficient computation under the control of operation fused coarse-grained instructions. A detailed description of the exemplary processing unit core 600 is not necessary to an understanding of aspects of the present technology, and therefore will not be described further herein.

Referring again to FIG. 5, the one or more cores 518-524 can execute one or more sets of computing device executable instructions to perform one or more functions including, but not limited to, a transcoder bitrate predictor 526. The one or more functions can be performed on individual core 518-524, can be distributed across a plurality of cores 518-524, can be performed along with one or more other functions on one or more cores, and or the like.

The transcoder bitrate predictor 526 can be configured to estimate a transcoder bitrate as described above with reference to FIGS. 3 and 4. The one or more processors 502 can output transcoder parameters 528 including the transcoder bitrate to the one or more transcoders 506. The one or more transcoders 506 can convert the first encoded content to a second content 532 using the transcoder parameters 528 including the transcoder bitrate.

Aspects of the present technology can advantageously estimate a minimum target bit rate for use as the transcoder bitrate that satisfies a predetermined quality. The estimated transcoder bitrate can advantageously increase the compression efficiency of the transcoder. Aspects of the present technology can also advantageously eliminate the need for a brute force determination of the optimal transcoder bitrate, thereby reducing computational complexity.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing system comprising:
one or more processors;
one or more non-transitory computing device readable storage medium storing computing executable instructions that when executed by the one or more processors perform a method comprising;
receiving an input encoded content; and
estimating a transcoder bitrate based on regression as a function of Euler's number (e) raised to a difference between a target video quality estimator and a natural log of a bitrate of the input encoded content; and
a transcoder configured to convert the input encoded content to the output encoded content based on one or more transcoding parameter values including the estimated transcoder bitrate.

2. The computing system of claim 1, wherein:
the input encoded content comprises a first encoded video content; and
the output encoded content comprises a second encoded video content.

3. The computing system of claim 1, wherein the video quality estimator comprises a video multimethod assessment fusion (VMAF) estimator of the input encoded content.

4. The computing system of claim 3, wherein the method further comprises:
training a plurality of video multimethod assessment fusion (VMAF) estimators based on a plurality of different encoding information; and
selecting the VMAF estimator of a corresponding one of the plurality of VMAF estimators matching encoding information of the input encoded content.

5. The computing system of claim 4, wherein the method further comprises:
receiving encoder information of the input encoded content;
determining if the received encoder information matches one of a plurality of existing sets of encoder information;
selecting a predetermined target bitrate as the transcoder bitrate when the received encoder information does not match one of the plurality of existing sets of encoder information; and
choosing a visual quality estimator of a corresponding one of the plurality of existing sets of encoder information matching the received encoder information.

6. A transcoding method comprising:
receiving an input encoded content and a set of encoder information of the first input encoded content;
determining if the received set of encoder information matches one of a plurality of existing sets of encoder information;

selecting a predetermined target bitrate as a transcoder bitrate when the received set of encoder information does not match one of the plurality of existing sets of encoder information;

choosing a visual quality estimator of a corresponding one of the plurality of existing sets of encoder information matching the received set of encoder information;

estimating the transcoder bitrate based on regression as function of Euler's number (e) raised to a difference between the chosen visual quality estimator and a natural log of a bitrate of the input encoded content; and transcoding the input encoded content into an output encoded content based on one or more transcoding parameter values including the estimated transcoder bitrate or the predefined target bitrate.

7. The transcoding method according to claim 6, wherein:

the input encoded content comprises a first encoding format and the output encoded content comprises video content encoded in a second encoding format.

8. The transcoding method according to claim 6, wherein the visual quality estimator comprises a video multimethod assessment fusion (VMAF) estimator.

9. The transcoding method according to claim 6, further comprising:

training a plurality of visual quality estimators based on a plurality of different encoding information; and selecting the visual quality estimator of a corresponding one of the plurality of visual quality estimators matching encoding information of the input encoded content.

10. A transcoding method comprising:

receiving an input encoded content;

estimating a transcoder bitrate based on regression as a function of Euler's number (e) raised to a difference between the chosen visual quality estimator and a natural log of a bitrate of the input encoded content; and transcoding the input encoded content into an output encoded content based on one or more transcoder parameter values including the estimated transcoder bitrate.

11. The transcoding method according to claim 10, further comprising:

training a plurality of video quality estimators based on a plurality of different encoding information; and selecting the video quality estimator of a corresponding one of the plurality of video quality estimators matching encoding information of the input encoded content.

12. The transcoding method according to claim 10, wherein the video quality estimator comprises a video multimethod assessment fusion (VMAF) estimator.

13. The computing system of claim 1, wherein estimating the transcoder bitrate further comprises estimating a minimum transcoder bitrate that provides a predetermined video quality.

14. The transcoding method according to claim 6, wherein estimating the transcoder bitrate further comprises estimating a minimum transcoder bitrate that provides a predetermined video quality.

15. The transcoding method according to claim 10, wherein estimating the transcoder bitrate further comprises estimating a minimum transcoder bitrate that provides a predetermined video quality.

\* \* \* \* \*